March 9, 1937. A. L. CARTER ET AL 2,073,095
PEA SEPARATING APPARATUS
Filed Oct. 21, 1935 2 Sheets-Sheet 1
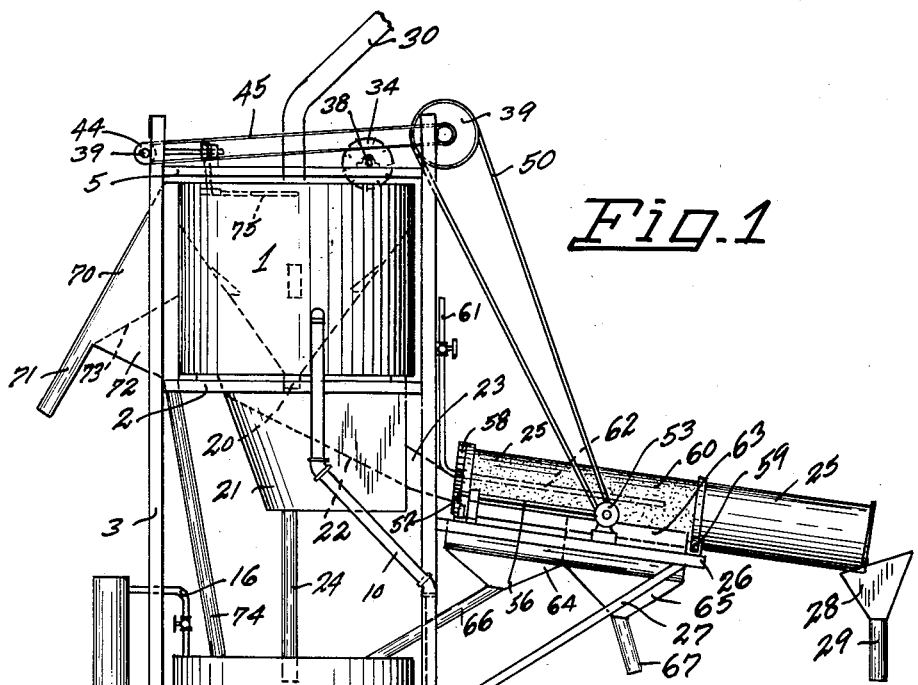
Fig. 1
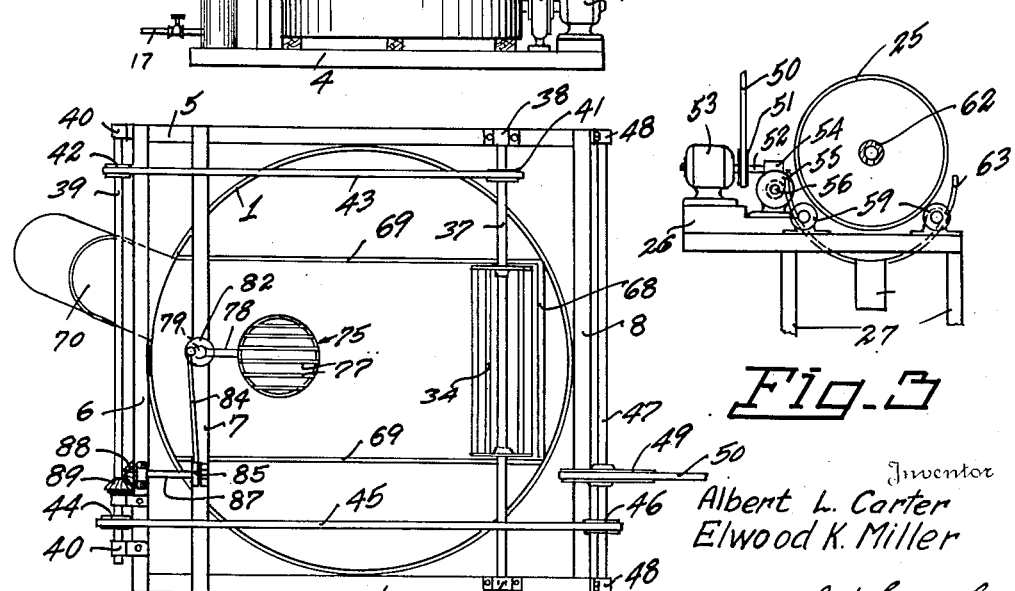
Fig. 2
Fig. 3
Inventor
Albert L. Carter
Elwood K. Miller
By Glenn L. Fish
Attorney

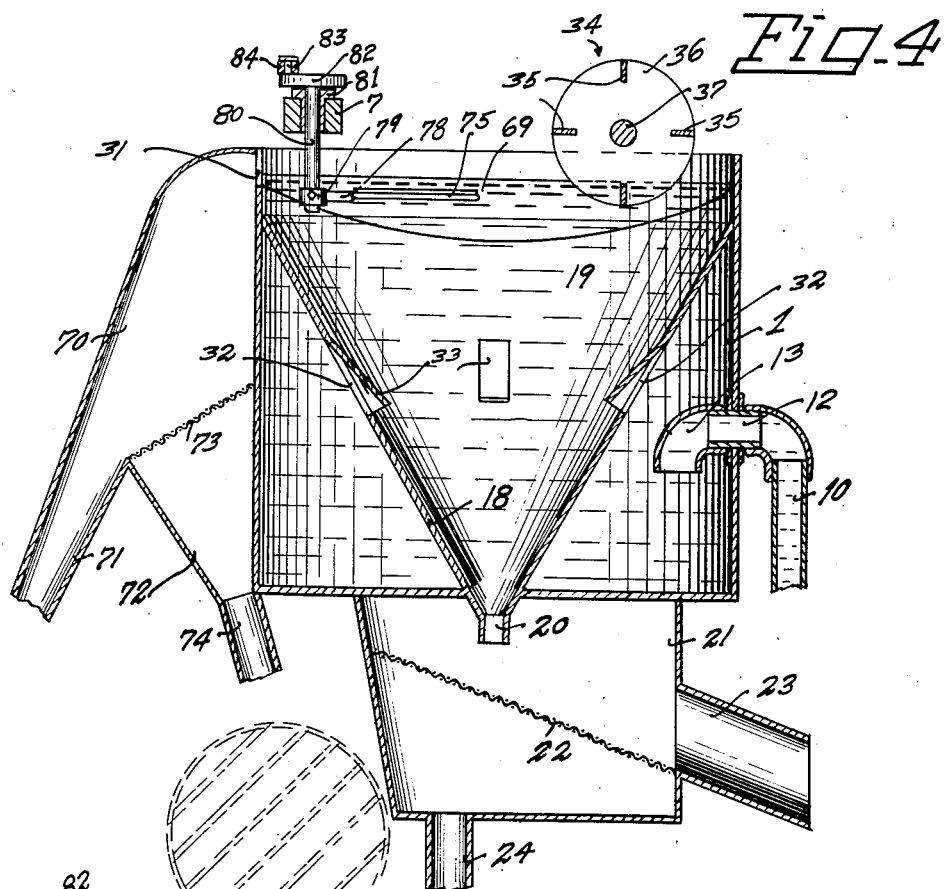
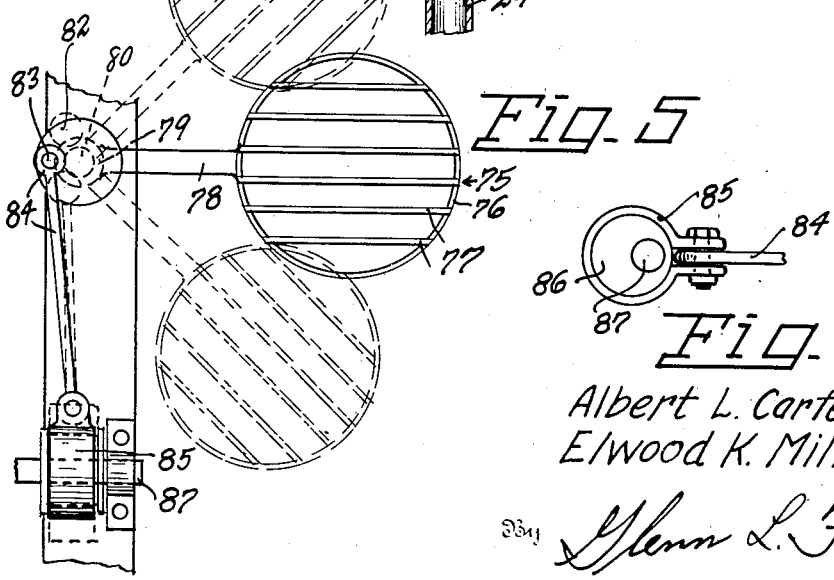

Patented Mar. 9, 1937

2,073,095

UNITED STATES PATENT OFFICE 2,073,095

PEA SEPARATING APPARATUS

Albert L. Carter and Elwood K. Miller, Spokane, Wash., assignors to Carter Miller Mill Furnishing Company, Spokane, Wash.

Application October 21, 1935, Serial No. 45,836

3 Claims. (Cl. 209—173)

This invention relates to an apparatus for separating wormy peas from good peas and one object of the invention is to provide a machine of such construction that the difference in specific gravity between good peas and wormy or weevilly peas in brine may be taken advantage of to cause separation of the peas by merely passing them through a body of salt water.

Another object of the invention is to so construct the apparatus that when it is in operation the peas may be dropped into a tank filled with brine so that the peas will pass beneath the surface of the salt water and the wormy peas which are light then rise to the surface while the good peas of greater weight move to the bottom of the tank for passage therefrom to a washer where the brine is removed by fresh water.

Another object of the invention is to so construct the machine that a circulation of brine will be permitted from a storage tank through the separating tank and back to the storage tank, provision being made for replenishing salt in the brine and thus compensate for a gradual weakening of the brine which would otherwise be caused by fresh water passing into the storage tank from the washer employed for removing brine from the good peas.

Another object of the invention is the provision of means for agitating floating peas as they approach the outlet for the wormy peas and thus cause air bubbles to be released from floating peas which are good and allow these peas to sink to the bottom of the separator tank.

Another object of the invention is the provision of improved means for directing floating peas towards the outlet for the same.

Another object of the invention is to provide an apparatus of this character which is of simple construction, easy to operate and not liable to get out of order.

The invention is illustrated in the accompanying drawings, wherein.

Fig. 1 is a view showing the separator in side elevation.

Fig. 2 is a top plan view of the apparatus with the washer omitted.

Fig. 3 is a view looking at one end of the washer.

Fig. 4 is a sectional view taken vertically through the separator tank and cooperating parts taken along the line 4—4 of Figure 2.

Fig. 5 is an enlarged view of the means for removing air bubbles from peas floating in the separator tank.

Fig. 6 is a fragmentary view in elevation of a portion of the operating mechanism for the bubble removing means.

The separator tank 1 of this apparatus is mounted upon a platform 2 of a supporting frame having corner standards 3 rising from a base 4 and at their upper ends carrying side bars 5 to which cross bars 6, 7, and 8 are secured. A brine tank 9 is supported upon the base 4 and in order to conduct salt water from the tank 9 to the tank 1, there has been provided a pipe 10 leading from a pump 11 to the tank 1 with its upper end attached to a nipple 12 which is secured through the wall of the tank 1, as shown in Figure 4 and at its inner end carries a downturned elbow or nozzle 13 which directs salt water entering the tank towards the bottom thereof. The pump 11 is driven by an electric motor 14 and draws brine from the tank 9 near the bottom thereof. At certain times it is necessary to replenish brine in the tank 9 to compensate for weakening of the strength of the salt water due to fresh water becoming mixed therewith as will be hereinafter explained and, therefore, there has been provided a reservoir 15 in which very strong brine is stored. This reservoir has a valve controlled pipe 16 leading from its upper end for delivering the brine into the tank 9 and at its lower end carries a valve controlled pipe 17 by which it may be drained when necessary. The pipe 17 may serve as means for supplying brine to the reservoir from a suitable source of supply, if so desired.

A conical partition 18 is mounted in the tank 1 to define an inner chamber 19 which tapers towards its lower end and in which the good peas accumulate. This chamber communciates at its lower end with an outlet neck 20 through which the peas and salt water pass into an auxiliary container 21 in which is mounted an inclined screen 22 sloping towards a discharge spout 23 and serving to separate peas from salt water passing through the container or housing. The water passes through the pipe 24 back into the tank 9 and the peas flow through the spout to a washer 25 mounted at one side of the supporting frame upon a shelf 26. Braces or struts 27 extend between the supporting frame and the outer end portion of the shelf and serve to support the shelf at the incline shown in Figure 1. As the washer extends at an incline the peas will readily pass through the same and into the mouth 28 of a pipe 29 through which they will pass to a suitable receptacle or place of storage.

The peas are delivered to the separator through a pipe 30 which terminates over the separator tank centrally thereof and in vertical spaced relation thereto and as the peas pass from this pipe they drop into the compartment 19. The peas pass below the surface of the water in the separator tank and as this is salt water the good peas will sink to the bottom of the compartment 19 but the wormy peas, which have less specific gravity than the good peas, will rise to the surface of the water and float. Air bubbles gather upon some of the peas and, therefore, some of the good peas will also float and move towards the outlet 31 of the separator tank with the wormy peas. Communication between the chamber 19 and the portion of the tank surrounding the same is by way of openings 32 formed in walls of the partition 18 and deflectors 33 are provided at these openings within the chamber 19 to direct the salt water towards the bottom of the chamber as it flows inwardly through the openings 32. This will serve to agitate the peas in the lower portion of the chamber 19 and permit wormy peas to easily separate from the good peas and rise to the surface of the water.

The floating peas are to be moved towards the outlet 31 and in order to do so there has been provided a paddle wheel 34 having blades 35 extending between and carried by disks 36 fixed to a shaft 37 which extends across the upper end of the tank 1 and is journaled in bearings 38 carried by the side bars 5 of the supporting frame. The paddle wheel turns in a direction to move the peas towards outlet of the tank and receives its rotary motion from a shaft 39 extending longitudinally of the cross bar 6 and mounted in bearings 40. Pulleys 41 and 42 are carried by the shafts 37 and 39 for engagement by a drive belt 43 and a second pulley 44 is carried by the shaft 39 for engagement by a belt 45 which engages about a pulley 46 carried by a shaft 47. This shaft 47 extends longitudinally of the cross bar 8 with its ends mounted in bearings 48 and carries a pulley 49 engaged by a belt 50, the lower portion of which is engaged about a pulley 51 carried by the shaft 52 of a motor 53 mounted upon the platform 26 at one side of the washer 25. This motor constitutes the source of power and its shaft carries a worm 54 meshing with a worm gear 55 carried by a shaft 56 which extends longitudinally of the shelf and carries a pinion 57 meshing with an annular rack or gear 58 extending about one end of the cylindrical washer. It will thus be seen that when the apparatus is in operation the paddle wheel and the cylindrical washer will both be driven from the motor 53. The washer rests upon rollers 59 carried by the platform 26, and, by referring to Figure 1, it will be seen that the portion of the washer over the platform is perforated to provide a cylindrical screen 60, whereas the portion projecting beyond the shelf is imperforate. Therefore, fresh water fed through a valve controlled pipe 61 to a tubular nozzle 62 extending axially through the perforated portion of the washer and directed upon peas passing through the washer to remove brine therefrom may drain through walls of the screen and into a trough 63 supported under the washer by the platform. The trough has funnel shaped portions 64 and 65 from which extend pipes 66 and 67, the pipe 66 extending to the brine tank 9 for delivering a mixture of fresh and salt water thereto and the pipe 67 extending to a sewer or other suitable place of disposal for the fresh water. It will thus be seen that the salt water will all be washed from the peas as they pass through the cylindrical screen of the washer and then pass through the imperforate portion thereof to the mouth of the pipe. As a mixture of fresh and salt water passes through the pipe 66 to the brine tank, the salt water in the tank would be gradually weakened and it is in order to counteract this weakening of the salt water that the tank or reservoir 15 has been provided to permit a fresh supply of strong brine to be fed into the tank 9 when necessary.

The floating peas acted upon by the paddle wheel and urged towards the outlet 31 must be guided towards this outlet, and in order to do so there has been provided a frame or baffle 68 which extends about the paddle wheel, as shown in Figure 2, with its arms 69 extending across the separator tank from ends of the paddle wheel and secured to walls of the tank in such position that the outlet is located between the arms. The peas upon reaching the outlet pass through the same into a spillway 70 mounted upon a side of the separator tank and having its lower portion shaped to provide spouts 71 and 72, a screen 73 being mounted in the spillway at the upper end of the spout 72 to permit salt water to pass through this spout and the pipe 74 leading therefrom back into the brine tank and direct the wormy peas through the spout 71. The wormy peas may drop into a suitable receptacle or pass through a pipe to any place desired where they may be ground and made into feed for stock or disposed of in any manner desired. As the screen 73 is inclined the peas will roll freely along it towards the spout 71.

The good peas which are held at the surface of the salt water in the separator tank by air bubbles adhering to them would be lost if they passed through the opening 31 with the wormy peas and in order to prevent this occurring there has been provided a sweep 75 consisting of a circular frame 76 formed of heavy wire and carrying rods 77. This sweep has a handle 78 extending radially from the frame 76 and terminating in a sleeve 79 fastened about the lower end of a shaft 80 disposed vertically and journaled through a bearing 81 carried by the cross bar 7. At its upper end the shaft 80 carries a disk 82 from which projects an eccentrically located pin 83 and about this pin is loosely engaged one end of a pitman 84 which extends longitudinally of the cross bar 7 with its other end pivoted to a collar 85 surrounding an eccentric or disk 86 carried by a shaft 87. This shaft is rotatably mounted in bearings carried by the cross bars 6 and 7 and at its end opposite from the disk 86 carries a bevelled gear 88 meshing with a gear 89 carried by the shaft 39. Therefore the shaft 87 is driven from the shaft 39.

The operation of this improved pea separator is as follows:

The peas to be separated are fed into the separator tank through the pipe 30 and as they drop from this pipe into the tank they pass beneath the surface of the salt water with which the separator tank is filled to the level shown in Figure 4. The good peas have sufficient specific gravity to carry them to the bottom of the chamber 19 and during this movement they are stirred up by the currents of water passing inwardly through the openings 32 so that any wormy peas will be separated from the good peas. The wormy peas rise to the surface of the water and good peas to which air bubbles have attached themselves will also rise to the surface. The floating peas are acted upon by the paddle wheel creating a current towards the passage 31 and moved towards the passage. In doing so the peas will encounter the sweep 75 which moves back and forth across the portion of the tank between the arms 69 of the frame 68 and the sweep will cause the peas to be agitated and air bubbles released so that the good peas may sink. The wormy peas remain floating and pass through the opening 31 into the housing. Upon entering the housing the peas drop to the screen 73 along which they roll until they reach the spout and any water passing through the opening 31 with the peas will drain from them through this screen and pass through the spout and the pipe 74 back into the brine tank. The pump 11 causes a circulation of salt water from the brine tank to the separator tank and back into the brine tank by way of the housing 21 and the pipe and as flow of brine through the pipes 10 and 24 is uniform a proper circulation will be maintained. The good peas upon reaching the bottom of the compartment 19 pass through the outlet neck 20 and drop upon the screen 22 along which they roll to the neck 23 through which they pass to the washer and enter the cylindrical screen thereof. The cylinder of the washer extends at an incline to cause the peas to move through the screen under the tubular nozzle of the fresh water pipe and, therefore, the salt water will be washed from the peas. The peas upon reaching the end of the cylindrical screen pass through the imperforate portion of the cylinder and into the mouth 28 of the pipe 29 through which they pass to the place where they are to be stored or packed. The fresh water and salt water washed from the peas is passed through the pipes 66 and 67, the portion passing through the pipe 66 being a mixture of fresh and salt water which is delivered into the brine tank and the portion passing through the pipe 67 being practically all fresh water and, therefore, conducted to a sewer. The fresh water which passes through the pipe 66 with the salt water washed from the peas would gradually reduce the strength of the salt water in the tank and eventually prevent the apparatus from operating properly and, therefore, the tank 15 has been provided so that at intervals strong brine can be fed into the brine tank and the salt water maintained at the desired strength. It will thus be seen that the apparatus is very efficient in operation and only needs attention of an operator when replenishing the brine in the tank is required by weakening of the salt water due to inflow of fresh water from the pipe 66.

Having thus described the invention, what is claimed as new is:

1. In a pea separator, a separating tank having an outlet in its bottom and a spillway in its side, means for circulating brine through said tank, means for delivering peas into the tank from above the brine whereby the peas pass below the surface and good peas sink to the bottom of the tank for passage through the outlet while defective peas and peas having air bubbles adhering thereto rise and float upon the brine, means for urging floating peas towards the spillway for passage through the same out of the tank, and means for agitating peas approaching the spillway and detaching air bubbles therefrom to cause good peas to sink, the last-mentioned means consisting of a support located above the level of brine in the tank, a rock shaft journaled vertically through said support, a head at the upper end of said shaft, an arm extending radially from the lower end of said shaft, a foraminous head carried by said arm and moving back and forth in a horizontal plane at approximately the level of the brine when the shaft is rocked, a driven shaft rotatably mounted, an eccentric disc carried by the driven shaft, a collar loose about said disc, and a pitman pivoted at its ends to the head and collar for imparting rocking movement to the rock shaft.

2. In a pea separator, a separating tank having an outlet in its bottom, means for delivering brine into said tank, means for delivering peas into the tank from above the brine whereby the peas will pass below the surface and good peas sink to the bottom of the tank for passage through the outlet while defective peas rise and float upon the surface of the brine, a spillway being formed through a side of the tank at the brine level, an annular partition disposed vertically in said tank and tapered towards its lower end, the lower end of the partition being disposed about the outlet, said partition dividing the tank into an outer brine receiving chamber and an inner pea receiving chamber and being formed with passages having deflectors associated therewith for directing incoming brine towards the bottom of the inner chamber, and means for urging floating peas towards the spillway.

3. In a pea separator, a separating tank having an outlet in its bottom, means for delivering brine into said tank, means for delivering peas into the tank whereby good peas will sink to the bottom of the tank and defective peas rise and float upon the brine, a spillway being formed through a side of the tank, and an annular partition disposed vertically in said tank, said partition having its upper end engaging walls of the tank below the spillway and the lower end of the partition engaging the bottom of the tank, said partition dividing the tank into an outer brine receiving chamber and an inner chamber and being formed with passages midway its upper and lower ends whereby brine may enter the inner chamber midway the depth thereof for urging defective peas upwardly towards the surface of brine and urging good peas towards the bottom of the inner chamber for passage through the outlet in the bottom of the tank.

ALBERT L. CARTER.
ELWOOD K. MILLER.